UNITED STATES PATENT OFFICE.

EDWIN D. CHAPLIN, OF MONTCLAIR, NEW JERSEY.

MANUFACTURE OF POTASSIUM CARBONATE.

1,325,713.  Specification of Letters Patent.  Patented Dec. 23, 1919.

No Drawing.  Application filed December 29, 1914.  Serial No. 879,453.

*To all whom it may concern:*

Be it known that I, EDWIN D. CHAPLIN, a citizen of the United States, residing in Montclair, in the county of Essex and State of New Jersey, have invented certain new and useful Improvements in the Manufacture of Potassium Carbonate, of which the following is a specification.

This invention relates to the production of potassium carbonate from the so-called "potash-bearing" minerals and a carbon-dioxid-supplying gas, and a principal object of the invention is to furnish an effective process whereby potassium carbonate may be economically produced by the use of mica as the potassium-supplying mineral.

In carrying out my process, the potash-bearing mineral may be broken, or ground more or less finely, by way of expediting the fusion stage, or step, of the operations, and, preferably, the mineral, when suitably broken up, is well mixed with an alkaline hydrate and this mixture then subjected to a complete fusion thereby producing a "fusion-product".

One feature of the process relates to the use, as a preferred hydrate, of a hydrate of the same material which is to be separated from the mineral. For instance, when the mineral is mica,—from which potassium is to be separated,—I preferably employ a potassium hydrate, and of a quantity having a potassium content largely in excess of the amount of potassium in the mica being treated.

The fusion-product may be conveniently formed, in practice, by mixing a "potash-bearing" mica (preferably in a finely broken form), in and with the alkaline hydrate, and then subjecting the mixture to a complete fusion. This operation may be readily performed in some suitable receptacle and furnace of ordinary character. When the said materials, after being properly mixed, are gradually heated, any free or uncombined water accidentally or otherwise contained therein will be driven off, so that when the mixture approaches nearly to the condition of initial fusion, the hydrate will have become substantially free of the solvent.

After the fusion is effected so that the mica is broken down and transformed in the fusion-product, this product may then be dissolved (after being sufficiently cooled) in some liquid or solvent preferably one chemically neutral to the said product, and also to carbon dioxid or to such other carbon-dioxid-supplying material as may be employed, and for this purpose water may be employed. The dissolved fusion-product is now subjected to a continued treatment by some suitable gas containing carbon, and oxygen, preferably carbon dioxid,—as by commingling the gas and the solution in any well-known manner, and the so formed potassium carbonate is recovered from the solution.

During the heating, to the proper high temperature, of a mixture of the mica in potassium hydrate, the mica, as I now understand, will be gradually dissolved, while the mica is in contact with and submerged in potassium hydrate, and, preferably, while both materials are subjected to heating by an increasing temperature which is continued to the point of a complete fusion of the two said materials into one fusion-product. In this operation, and so far as I now understand the details thereof, the heating of the two materials is effected in a progressive manner, the heating being continued to the point of a fusion of the mica and the melting hydrate in one fusion product, adapted for subsequent solution and for the separation of its constituent compounds.

It will be understood that when, in the foregoing process, a potassium-supplying mineral is treated by the aid of an alkaline hydrate not containing potassium, a plurality of kinds of carbonates may be produced during the treatment of the dissolved fusion-product by the carbon-dioxid-supplying material, so that, in such cases, a subsequent separation of the several alkaline carbonates from each other, will usually be required. When the mineral also contains alumina or other metal compounds,—as in the case of mica,—such aluminum, or other metal compounds, as may be produced in the fusion-product, or subsequently produced in the dissolved fusion-product, may be largely removed, in practice, by the methods of deposition and filtration, and in some instances by the use of suitable reagents employed in subsidiary processes.

When successive quantities of the mineral are treated by my process, and if, in any one complete operation, all the alkali-metal,—as potassium,—is converted to the form of carbonate, a portion of this carbonate resulting from one said operation, may be reconverted (in a well-known manner) into hydrate, and so be re-used in the making of the fusion-product in a second operation. Thus the operations may be carried on in a continuous manner, by the re-using of the same alkaline hydrate, this being first augmented from the mineral, and later reduced by the separation and withdrawal of a part of the carbonate products, and so on, indefinitely. Thus, in the more complete development of my invention, the dissolved fusion-material may be treated to the extent of combining only a portion of the contained potassium with carbon-dioxid-supplying material, to form carbonate, and separating and removing only a portion of this resultant product, thereby leaving a residuary potassium hydrate in water or solvent, to which more mica will be added and dissolved by further heating, and then the process be repeated in a continuous manner.

In some instances, if desired, the mica may be subjected to my process while it is in a mixture with other substances, especially if such foreign materials are present in a relatively small amount, and the entire fusion-product may then be treated for producing the carbonate, by subjecting said fusion-product to the action, in the presence of oxygen (supplied in any convenient manner), of a suitable carbon-supplying material, or of carbon-dioxid; and the products thus obtained may be used for some purposes, without a separation—or recovery by itself—of the carbonate; and in such an instance, the fusion product may be pulverized, as for instance, when the entire product is to be used as a fertilizer, and the usual crystallization process may be omitted.

By the term hydrate of a fixed alkali, I refer to hydrates of the alkali metals, thereby distinguishing these from the alkaline earths, and also from the so-called volatile alkali.

Having thus described my invention, I claim:

1. The hereindescribed improvement in the art of manufacturing potassium carbonate which consists in heating mica in the hydrate of a fixed alkali metal and to the point of fusion, and subjecting the so-obtained product while still molten and under conditions to form carbon-dioxid to the action of a carbon-supplying material in the presence of oxygen.

2. The hereindescribed improvement in the art of manufacturing potassium carbonate which consists in heating a mineral comprising mica in the hydrate of a fixed alkali metal and to the point of fusion of the mica, and subjecting the so-obtained product while the mica is still molten and under conditions to form carbon-dioxid to the action of a carbon-supplying material in the presence of oxygen.

3. The hereindescribed improvement in the art of manufacturing potassium carbonate which consists in heating a mica-carrying material in the hydrate of a fixed alkali metal and to the point of fusion of the mica, and subjecting the so-obtained product while still molten and under conditions to form carbon-dioxid to the action of a carbon-supplying material in the presence of oxygen, and then gradually lowering the heat of the associated materials.

4. The hereinbefore described improvement in the art of treating minerals comprising mica, which consists in heating to the point of fusion the mineral comprising mica in a hydrate of an alkali metal having a potassium content in excess of the amount of potassium in the mica of the mineral being treated, and subjecting the so-obtained product while still fused and molten, and under conditions to form carbon-dioxid, to the action of a carbon-supplying material in the presence of oxygen.

5. The hereinbefore described improvement in the art of treating minerals comprising mica, which consists in heating to the point of fusion the mineral comprising mica in a hydrate of an alkali metal having a potassium content in excess of the amount of potassium in the mica of the mineral being treated, and subjecting the so-obtained product while still fused and molten, and under conditions to form carbon-dioxid, to the action of carbon in the presence of oxygen.

6. The hereinbefore described improvement in the art of manufacturing potassium carbonate which consists in heating mica in potassium hydrate, of a quantity having a potassium content in excess of the amount of potassium in the mica, to the point of fusion, and subjecting the so-obtained product while still fused and molten, and under conditions to form carbon-dioxid, to the action of a carbon-supplying material in the presence of oxygen.

7. The hereinbefore described improvement in the art of manufacturing potassium carbonate which consists in heating mica in potassium hydrate, of a quantity having a potassium content in excess of the amount of potassium in the mica, to the point of fusion, and subjecting the so-obtained product while still fused and molten, and under conditions to form carbon-dioxid, to the action of carbon in the presence of oxygen.

EDWIN D. CHAPLIN.

Witnesses:
H. D. PENNEY,
J. F. V. CHRISTOPHER.